Figure 1:
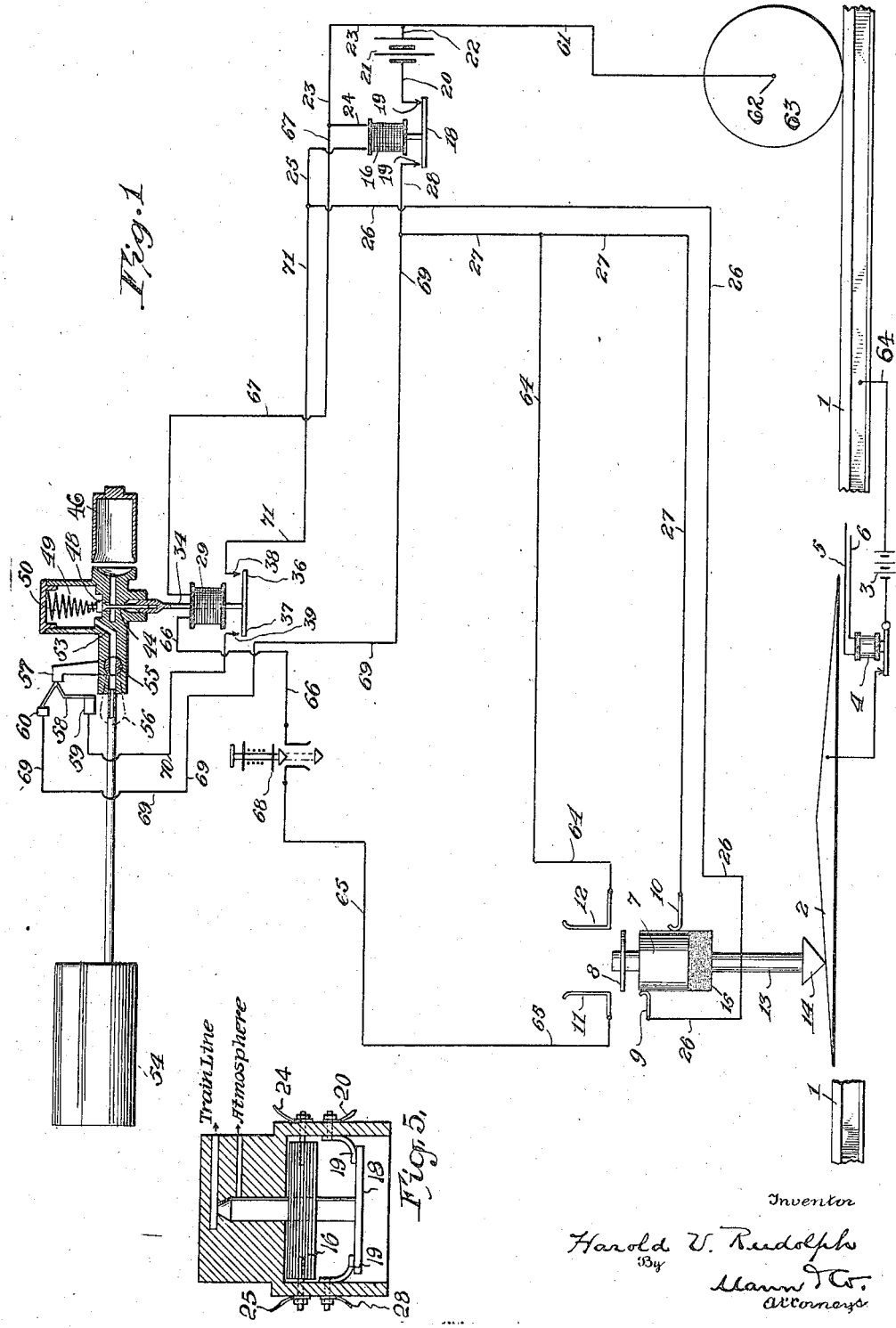

July 17, 1923. 1,462,358

H. V. RUDOLPH

SPEED CONTROL MECHANISM FOR VEHICLES

Filed May 14, 1921 3 Sheets-Sheet 1

July 17, 1923.

H. V. RUDOLPH 1,462,358

SPEED CONTROL MECHANISM FOR VEHICLES

Filed May 14, 1921

3 Sheets-Sheet 3

Inventor
Harold V. Rudolph
By
Mann & Co.,
attorneys

Patented July 17, 1923.

1,462,358

UNITED STATES PATENT OFFICE.

HAROLD V. RUDOLPH, OF BALTIMORE, MARYLAND, ASSIGNOR TO AMERICAN AUTOMATIC TRAIN CONTROL CORPORATION, OF BALTIMORE, MARYLAND, A CORPORATION OF MARYLAND.

SPEED-CONTROL MECHANISM FOR VEHICLES.

Application filed May 14, 1921. Serial No. 469,437.

*To all whom it may concern:*

Be it known that HAROLD V. RUDOLPH, a citizen of the United States, residing at Baltimore, State of Maryland, has invented certain new and useful Improvements in Speed-Control Mechanism for Vehicles, of which the following is a specification.

This invention relates to an improved speed-control mechanism for automatic train control systems and is especially designed for use in that class of train control systems wherein a control shoe is carried on the vehicle and so arranged as to be moved by contacting with ramp rails along the trackway whereby to operate a shoe-switch on the vehicle and open or close electric circuits to break down or maintain the vehicle mechanism according to the conditions of the track ahead.

In said systems it is usually planned, when the track ahead is clear, to pick up a current from the ramp-rails and substitute it for the normal vehicle current while the shoe-switch is open, and in case the track ahead is occupied, to cut-off the current from the ramp-rail which guards the occupied section of track, so that no current can be picked up to be substituted for the broken vehicle circuit, and thus deenergize magnets on the vehicle that will cause an automatic stop of the same.

It has now been found desirable in railroad operations to permit a vehicle to enter an occupied block or section, provided the speed of the vehicle is reduced to a point of safety, and the object of the present invention is to provide improved mechanism on the vehicle whereby the vehicle mechanism may be maintained in a running condition when passing a deenergized ramp-rail to which the current source on the trackway is cut off, only however in case such vehicle is traveling at a sufficiently low speed to be deemed safe.

Heretofore it has been proposed to combine with a speed-control relay, a dash pot, whereby to retard the operation of the vehicle relay, or to provide mechanical elements to effect the same result, but both of these as heretofore proposed have objectionable features which are liable to be encountered in actual practice.

An object, therefore, of this invention is to provide novel means whereby in case the speed control relay is not operating correctly, a warning signal will be given to the engineer.

Another object of the invention is to provide novel means whereby the speed control operation of the relay may be rendered inoperative in case the warning signal is cut out for any reason.

A further object of the present invention is to provide an improved construction of a time interval relay, operated on a normally open circuit, wherein the time interval is made use of to control the armature of the relay itself.

The invention is illustrated in the accompanying drawings, wherein,—

Fig. 1. illustrates in a diagrammatic way the several devices and circuits on the vehicle for carrying the invention into practical effect.

Figure 2:
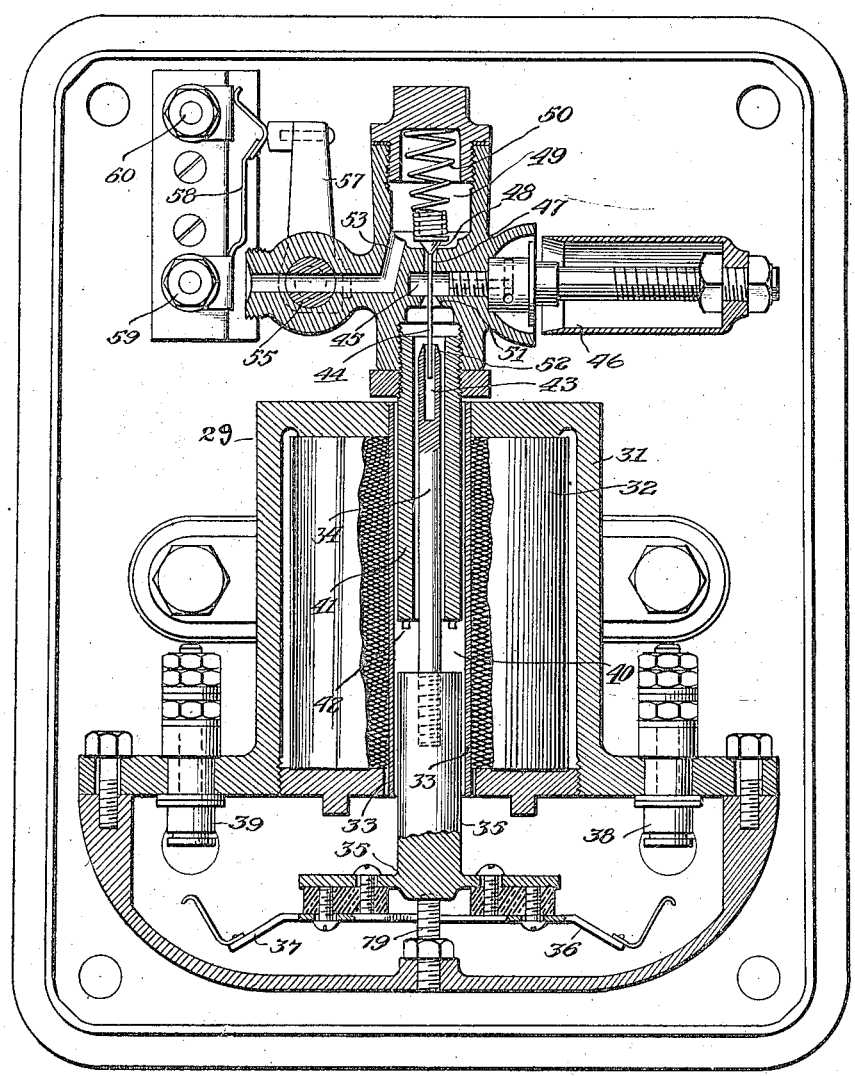

Fig. 2. shows the improved relay in vertical sectional elevation.

Figure 3:
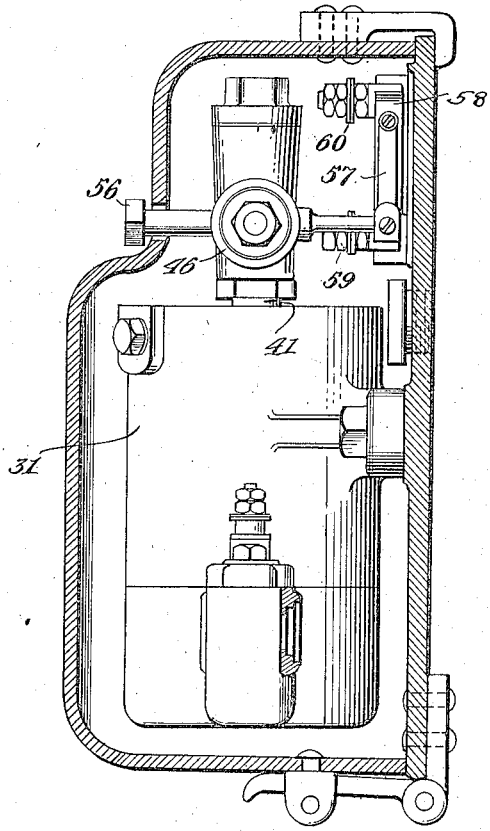

Fig. 3. illustrates the same in side elevation,—the casing being broken away to disclose the parts therein.

Figure 4:
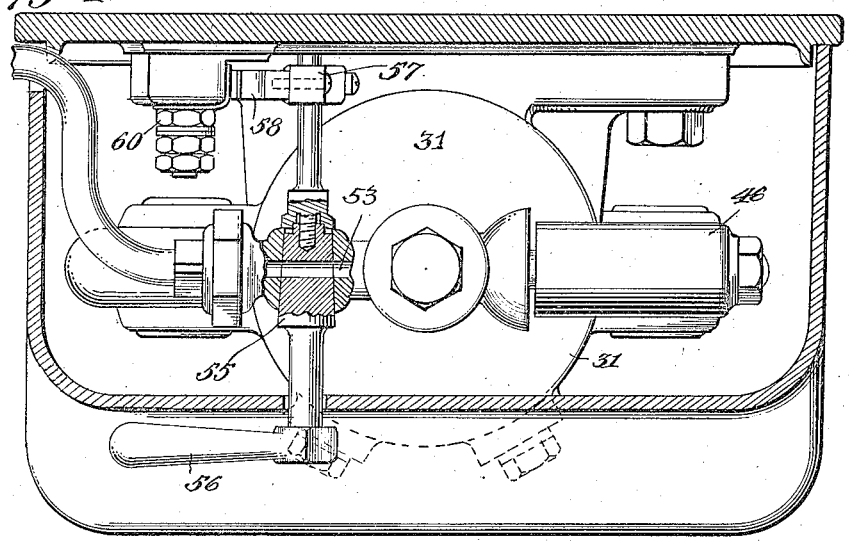

Fig. 4. shows the same in top or plan view and

Fig. 5. shows a sectional detail of a form of stop-valve magnet.

Referring to the drawing the numeral 1, designates a track-rail; 2 the ramp-rail which normally, when the track ahead is clear, is connected to one side of a ramp-rail current-supply 3, through a track-relay 4. The other side of the current-supply 3, has a connection with the track-rail 1, while the track-relay 4, is controlled through wires 5 and 6 by a circuit that is normally closed when the track ahead is clear, and open when the track ahead is occupied or in a dangerous condition.

All of these features are common in train-control devices now in use and are not claimed in themselves by me.

On the vehicle I provide a plurality of movable circuit breakers or switches 7 and 8 and a plurality of switch contacts 9 and 10 for one switch and 11 and 12 for the other switch.

The two switches are designed to be moved simultaneously and are so arranged that when one is moving in a direction to open one circuit the other is moving in a direction to effect a closure of another circuit.

It is not essential just what means be employed to effect a movement of the two switches but in the present instance I show a stem 13, connecting the two switches and carrying a contact shoe 14, at its lower end which shoe is so located on the vehicle as to engage in succession the ramp-rails 2, which are provided at intervals along the trackway and are so inclined as to impart a vertical movement to the shoe, stem and switches as each ramp-rail is passed.

In some instances the vehicle carries two shoes and two sets of switches and contacts but the operation is the same in either case and illustration of the two shoes and corresponding contacts is deemed unnecessary in this case.

In the present instance the switch 7, is designed with an upper contact surface and a lower insulating surface 15, which latter will not conduct electrical current.

On the vehicle I provide a control valve relay which in practice is designed as a combined electro-pneumatic valve 16, of such construction as to effect a venting of the train-line of an air-brake system when the magnet is deenergized and thereby apply the air-brakes. This control relay is of a well-known construction and a detailed illustration of the same is deemed unnecessary in this case.

The control relay has an armature 18, which latter is held up, when the relay is energized, so as to engage a contact 19, and the contact is connected by a wire 20, to one side of a vehicle current supply 21. Connections 22, 23 and 24, are provided from the other side of the vehicle current supply 21 to the control magnet 16, and connections 25 and 26, extend from said control magnet 16, to the shoe-switch contact 9.

It will also be noted that from shoe-switch 10, I provide connections 27 and 28 to the contact 19, with which armature 18, contacts.

From the above explanation it will be seen that normally the vehicle current supply 21, keeps the control-magnet 16, energized when switch 7 is in engagement with contacts 9 and 10 and that the circuit thus maintained through the control magnet is a stick-circuit because it includes the armature 18, of the magnet which is energized.

It is to be particularly noted that the switch-contacts 9 and 10 which the switch 7, engage are so disposed that when the switch moves up the contact 10, after a certain movement of the shoe has been made, will be engaged by the insulation 15, whereas the contact 9, will always engage the contact surface 7, and that when the contact 10, is on the insulation 15, the normal circuit across the switch 7, between said two contacts 9 and 10, will be interrupted.

Just what occurs upon the interruption of the normal circuit across the switch 7, depends on whether the track ahead is clear, or if occupied, upon the speed of travel of the vehicle, and these conditions will presently be explained.

On the vehicle I employ what I term my improved time interval relay 29, which is shown in detail in Figs. 2, 3 and 4 of the drawings.

This relay has a coil housing 31 in which a coil 32 is located and at the center of this coil there is a tube 33 in which an armature rod or valve stem 34, has movement.

The lower end of this armature rod is carried by a head 35 having contact fingers 36 and 37 which are positioned so as to engage stationary contacts 38 and 39 when the coil is energized and the armature held up.

An adjusting screw 79, carried by the case serves as a stop for the armature head and also provides for varying the air-gap 40, between the end of the armature and stop 41 when the armature is down and the coil deenergized.

Stop pins 42, are provided in the end of the stop 41, so that when the armature is up it will engage these pins and keep the armature slightly spaced from the stop and prevent residual magnetism and the resultant "sticking-up" of the relay.

Of course, when the armature moves in either direction the valve stem 34 will move with it.

The upper end of the valve stem has a central recess 43 in which the lower end of a valve-actuating pin 44, depends.

This pin extends across a chamber 45, with which a whistle structure 46, is connected, and the upper end of said pin enters an air-inlet port 47, and engages a valve 48, that controls said port.

The air-control valve 48 is located in a chamber 49, and is held to its seat by a spring 50 when the pin is depressed sufficiently to permit its seating, which is under normal conditions when the coils are deenergized.

A guide port 51, is provided at the lower side of the chamber 45, through which the pin 44, passes and the lower side of this port is beveled so as to form a seat in order that the tapered upper end 52, of the valve stem 34, may seat against said seat 51 and cut off the passage of air down on top of the valve stem.

The chamber 49, is supplied with air by a passage 53, which is fed from the main reservoir 54 of the air-brake system on the vehicle.

A cock 55, is provided in the air-supply passage 53, whereby to cut off the air to chamber 49. This cock has a handle 56 and a contact arm 57 which, when the cock is open, engages a spring contact plate 58, and moves the latter to a position where a circuit will be closed between two stationary contacts 59 and 60, for a purpose that will presently be explained.

Circuit for valve magnet relay.

Normally, when the vehicle is traveling between ramp rails the valve magnet relay is kept energized by current from the vehicle current supply or battery 21, by a circuit as follows:

From one side of the current supply 21 by connections 20, 19, 18, 19, 28 and 27 to shoe switch contact 10, then across the cylinder 7 to contact 9; then by connections 26 and 25 to and through valve magnet relay 16 and return by connections 23 and 22 to other side of battery 21. The valve magnet relay 16 is thus normally energized so as to keep the control or air-brake mechanism in the running condition.

This normal circuit through the valve magnet relay is a stick circuit, including as it does the armature 18 of the relay it energizes.

Ramp current circuit for valve magnet.

When the contact shoe 14 on the vehicle engages a ramp rail 2, said shoe will be raised, carrying the stem 13, and both contacts 7 and 8 with it. Contact 7 will raise until the insulation 15, engages the contact 10, thereby interrupting the circuit across the cylinder 7 between contacts 9 and 10. Before this interruption takes place however, the current picked up by the shoe from ramp-rail 2 (such current being supplied by local battery 3) will be conducted by the stem 13 to cylinder 7, then by contact 9 and wires 26 and 25 to valve magnet relay 16; energizing the latter; then return by wires 24, 23, 61 to the axle 62, wheel 63 and to track rail 1, and finally from the track rail by wire 64 back to local current supply 3.

This picked-up current therefore keeps valve magnet 16 energized while the shoe is traveling over an energized ramp rail.

By reference to Fig. 1 of the drawing it will be noted that the shoe switch contact 12, is connected by wires 64, 27 and 28 to one of the contacts 19, the armature 18 the other contact 19 and wire 20 to one side of vehicle battery 21.

It will also be noted that the other shoe switch contact 11, is connected by wires 65 and 66 to the speed control relay 29 and that wires 67, 23 and 22 form the return from the valve magnet relay to the vehicle battery 21.

In this latter speed control circuit I provide a manually-operated switch 68, which latter is designed so that normally it will keep the circuit open even though the shoe switch 8, closes with contacts 11 and 12 when a clear or energized ramp rail is engaged by the shoe 14.

Attention is called to the fact that the speed control relay 29 and its circuits are controlled through the valve magnet relay 16, which latter must be energized when the speed control is actuated.

By again referring to Fig. 1, of the drawing it will be seen that a wire connection 69, is provided between the cut-off-cock contact 60, and the wire 28 which connects with the vehicle battery 21, and that another wire connection 70, leads from the other cut-off-cock contact 59 and connects with the armature contact 39 of the speed or time-interval relay 29.

Another wire 71, connects the armature contact 38 of the time-interval or speed relay 29, with the wire 25, that connects with the coils of the valve control relay 16 so that when armature-contacts 37 and 36 of the time-interval relay close with contacts 39 and 38, a substitute holding stick-circuit will be formed through the valve magnet relay 16, provided the cock-switch arm 57, is in the open position, and further provided that the valve-magnet relay 16, does not become deenergized before the time interval relay 29 picks up.

Operation when shoe engages deenergized ramp with vehicle at safe speed.

Normally the speed or time-interval relay is deenergized and the circuit controlling it is open but the valve-magnet relay circuit is normally closed.

When a dead or deenergized ramp-rail is being approached either of two operations may take place.

If the vehicle is traveling at a high or unsafe speed, an automatic stop will be produced regardless of anything the engineer might do to prevent it.

If such vehicle is traveling at a safe or low speed then the engineer may, after certain manual operations on his part, proceed without having his train automatically stopped, and as long as the speed control means is in operation a continuous signal will be given the engineer.

When a deenergized ramp rail is reached the contact shoe 14, will ride up thereon and raise the shoe-spindle 13 enough to close the circuit, through the speed control relay contacts 11 and 12. This closing of the movable shoe contact 8 with the stationary contacts 11 and 12 is designed to take place before the shoe-contact 7 moves from engagement with contact 10 thus supplying current from the vehicle battery 21 by connections 20, 19, 18, 19, 28, 27, 64, 12, 8, 11, 65, 68, and 66, to the relay coil 32 (providing switch 68 is held closed). The electro-magnetic action of this current in the coil causes the armature 35, with its attached valve stem 34, to be attracted towards the armature stop 41. The coil 32, in this instance is made of five separate coils which are connected in multiple, which arrangement allows for a much larger air gap 40 than if one coil connected in series were used, and the pull of the coil is not as great at a large air gap as at a small air gap, consequently a delay or retarded action is gained. This delay or retarded feature of the coil is taken advantage of and may be varied by the aid of an air-gap adjusting screw 79 which I provide to increase or decrease the air-gap to meet the requirements of the case.

The two pins 42, inserted in the armature stop 41, project slightly below the latter and when the armature 35 is up, it rests against these pins, which ensure the formation of a small air-gap between the armature stop and the end of the armature, thereby preventing residual magnetism in either part from sticking the relay up. When the armature 35 rises, or is drawn toward the stop 41 the same is guided by the armature tube 33 and the valve stem 34 which is attached to the armature rises with it. This valve stem 35 has a recess 43 in its upper end which forms a guide and stop for the lower end of the pin 44. When the valve stem 34 has risen far enough, the bottom of the recess engages the lower end of the pin 44 and the force exerted by the coils overcomes the pressure of the pin spring 50 and thereby lifts the valve 48 off its seat and allows air pressure to flow and operate the whistle 46.

When a deenergized ramp rail 2 is reached and the speed of the vehicle has been reduced because of the caution signal previously given the engineer, the latter will have closed the switch 68 before the deenergized ramp rail has been engaged by the contact shoe.

As the speed has been reduced the travel of the shoe 14 up the gradually inclined ramp 2, will be slow, as compared to its movement when the vehicle is traveling at a higher or unsafe speed, and before the contact 7 passes from contact 10, the contact 8 of the shoe switch will engage contacts 12 and 11. This prior engagement between contacts 12—8 and and 11 before the interruption of the circuit between contacts 10, 7 and 9 is sufficient, with regard to time, provided the vehicle is traveling slowly, to enable the current from the vehicle battery 21, to pass by connections 20, 18, 28, 27, 64, 12, 8, 11, 65, 68 and 66 to the magnet 29, and energize the latter and pick up armature 36—37, before the current passing through contacts 10, 7 and 9 to magnet 16 will be interrupted. Consequently as soon as armature 36—37 is up a substitute circuit from the vehicle battery 21, through the armature 18 of magnet 16 and the armature 36—37 of magnet 29, will be formed to keep the magnet 16 energized and prevent an automatic operation of the brakes, provided the speed of the vehicle has been reduced sufficiently to enable the substitute circuit to be formed and the comparatively slow-acting relay 29 to pick up, before the shoe has raised sufficiently to open the circuit between contacts 10, 7 and 9.

The term "slow-acting" as applied to the magnet 29 herein is to be understood to be a magnet that acts more slowly than a quick-acting magnet. The former may in reality operate in one-fourth of a second while the latter may operate in one-one-thousandth of a second, more or less.

The air whistle is controlled by means of a cut-out cock 55. A pipe is run to the whistle valve from the main reservoir 54 and as the normal position of the pin 44 is closed, the whistle does not blow. This feature is used for the dual purpose of serving as a warning signal to the engineer when passing a contact rail and as a warning signal to him when anything is wrong with the relay. As the ramp rails are only placed at intervals, the whistle should only blow intermittently. If the whistle should blow continuously and after a ramp rail is passed, it is a warning that something is wrong with the relay and the latter should be cut out. The leakage of the main reservoir air from the air brake system for a prolonged interval of time will cause trouble in keeping up the desired pressure, as this leak will prevent the pump governor from automatically closing off the pumps. In order to cut out the whistle the cut out cock handle 56 must be moved to a vertical position, which cuts off the air supply to the whistle.

Attached to the cut out cock key is a switch lever arm 57, which is arranged in such a manner that it bears against a contact spring 58 and closes a path for a circuit between two contacts 59 and 60. Suitable insulating material is provided to prevent the short circuiting of the vehicle battery at this point. This lever arm 57, moves with the cut out cock key and only a slight movement from the horizontal is needed to open the path for the valve magnet holding circuit through contacts 59 and 60 and to close off the air to the whistle. The connections to the valve-magnet 16 are broken through the switch 58 so that with the cut-out cock closed, and the whistle cut off, the speed control feature of the relay is inoperative even though the armature itself is stuck up, thus checking the relay on itself. The armature and contact fingers 36—37 and the adjusting screw 79 are protected from unauthorized interference by means of the cover. The contacts 36 and 37 are so arranged that when the armature is attracted to the coil the contacts engage suitable contact surfaces 38 and 39.

This arrangement breaks the valve magnet holding circuit also. Suitable insulating material is so placed as to insulate the contact finger from the armature proper.

The circuit for picking up the speed control relay has the spring switch 68 in it so that the engineer is required to close this switch, after he has gotten a caution signal and, have the same closed while the contact shoe is passing over a ramp rail because the shoe-switch contacts 11 and 12 and the shoe switch 8, are all parts of this substitute speed control circuit. If the vehicle is traveling at too great a speed then the circuit for holding the valve magnet relay 16 will be interrupted and an automatic stop will follow.

The circuit for holding the valve magnet 16 up when this condition exists, is broken through the switch 58 attached to the whistle cut out cock key, and then through the contacts 39 and 38 on the relay 29 itself, so that there are two possible openings in the path of this circuit which must be closed. The position of the whistle cut out cock handle is normally open, and the switch contact normally closed.

Of course the speed control feature of the relay will not come into effect unless the engineer pushes the key 68.

Having described my invention, I claim,—

1. In a train control apparatus the combination with a vehicle having a stop device, a current supply, a contact shoe, a plurality of pairs of shoe switches, a speed control device, a signal device, a normally closed circuit including the stop device the current supply and one pair of shoe switches, a normally open circuit between said current supply and the stop device, a normally open circuit between the current supply the speed control device and another pair of the shoe switches, means for operating the signal when the last-named normally open circuit is closed, and means for cutting out the signal and forming a second break in the said first-named circuit.

2. In a train control apparatus the combination with a vehicle having a stop control device, of a current supply on the vehicle; plural pairs of switch contacts and switch means therefor also on the vehicle; means to effect an operation of the switch means as the vehicle travels; a normal circuit on the vehicle between the vehicle current-supply one pair of switch-contacts and the control means; a normally-open circuit on the vehicle between the vehicle current-supply and the said control means; means on the vehicle and having a retarded action for closing said normally-open circuit from the vehicle current supply through the vehicle control-means as the switch means is operated, and signal means on the vehicle and controlled by the retarded acting means.

3. In a train control apparatus the combination with a vehicle having a stop device, of a current supply on the vehicle; means for normally maintaining the stop device from the vehicle current-supply; a normally open circuit also on the vehicle between the said vehicle current-supply and the said stop device; a retarded speed control circuit closer also on the vehicle to close said normally open circuit; means for actuating said retarded speed-control circuit-closer and a signal device operated when the said normally-open circuit is closed.

4. In a train control apparatus the combination with a vehicle having a stop device, of a current supply on the vehicle; means for normally maintaining the stop device from the vehicle current supply; a retarded circuit-closer also on the vehicle; connections also on the vehicle for forming a stick-circuit from the vehicle current-supply through the said stop device when the retarded circuit closer has been actuated, and a signal device on the vehicle and operated when the stick circuit is closed.

5. In a train control apparatus the combination with a vehicle having a stop device, of a current-supply on the vehicle; switch means on the vehicle,—connections between the vehicle current-supply and the switch means for forming a normal stick-circuit through the stop device; a circuit closer also on the vehicle; connections for forming a substitute stick-circuit from the vehicle current-supply through the said circuit closer and the said stop device and a signal device on the vehicle operated continuously as long as the substitute stick circuit is maintained.

6. In a train control apparatus the combination with a vehicle having a stop device, a current supply, a contact shoe and switches operated by the shoe, of a speed control device; means for normally maintaining a circuit from the current supply through two of the switches and the stop device when the shoe is in one position; a normally open circuit between the said current supply and the said stop device; a normally open circuit between the said current supply the speed control device and the stop device a fluid pressure signal device on the vehicle and means for admitting fluid pressure to the signal when the normally open circuit between the current supply the speed control device and the stop device is closed.

7. In a train control apparatus the combination with a vehicle having a stop device, a current supply a contact shoe and switches operated by the shoe, of a speed control device; means for normally maintaining a circuit from the current supply through two of the switches and the stop device when the shoe is in one position; a normally open circuit between the said current supply and the said stop device; a normally open circuit between the said current supply the speed control device and the stop device a fluid pressure signal device on the vehicle; means for admitting fluid pressure to said signal when the latter circuit is closed; a valve for cutting off the fluid pressure and a switch device operated by the movement of said valve to form a second break in said latter normally open circuit.

In testimony whereof I affix my signature.

HAROLD V. RUDOLPH.